United States Patent [19]

Allbert et al.

[11] 4,274,465
[45] Jun. 23, 1981

[54] PNEUMATIC TIRE AND WHEEL RIM ASSEMBLY

[75] Inventors: Barrie J. Allbert; Tom French, both of Sutton Coldfield; Ian Kemp, Tamworth; Michael R. Corner, Coventry, all of England

[73] Assignee: Dunlop Limited, London, England

[21] Appl. No.: 75,529

[22] Filed: Sep. 13, 1979

[30] Foreign Application Priority Data

Sep. 27, 1978 [GB] United Kingdom ............... 38454/78

[51] Int. Cl.³ ...................... B60B 21/10; B60B 25/02
[52] U.S. Cl. ................................ 152/379.5; 152/380; 301/97
[58] Field of Search .................. 152/378, 379.3, 379.5, 152/380, 381.3–381.6, 383, 362 R, 362 CS; 301/31, 95–97

[56] References Cited

U.S. PATENT DOCUMENTS

| 399,357 | 3/1889 | Thomas | 152/379.3 |
|---|---|---|---|
| 485,633 | 11/1892 | Keating | 152/380 |
| 2,193,131 | 3/1940 | Hansen | 301/31 |
| 3,977,727 | 8/1976 | Glasenapp et al. | 301/97 |
| 4,029,139 | 6/1977 | Abbott | 152/379.3 |

FOREIGN PATENT DOCUMENTS

25201 of 1896 United Kingdom ................. 152/379.3

*Primary Examiner*—Charles A. Marmor
*Attorney, Agent, or Firm*—Stevens, Davis, Miller & Mosher

[57] ABSTRACT

A pneumatic tire and wheel rim assembly is disclosed in which the rim bead seats are provided with retaining means for retaining the associated tire bead therein. Preferably the bead seats comprise grooves the side portions of which are provided with the retaining means comprising projections such as teeth which engage and retain the associated tire bead in the groove. Alternatively the retaining means comprises retaining members each of which extends across the width of the associated groove through the tire bead to retain the bead in the groove. Preferably the rim is multi-component to facilitate assembly.

13 Claims, 1 Drawing Figure

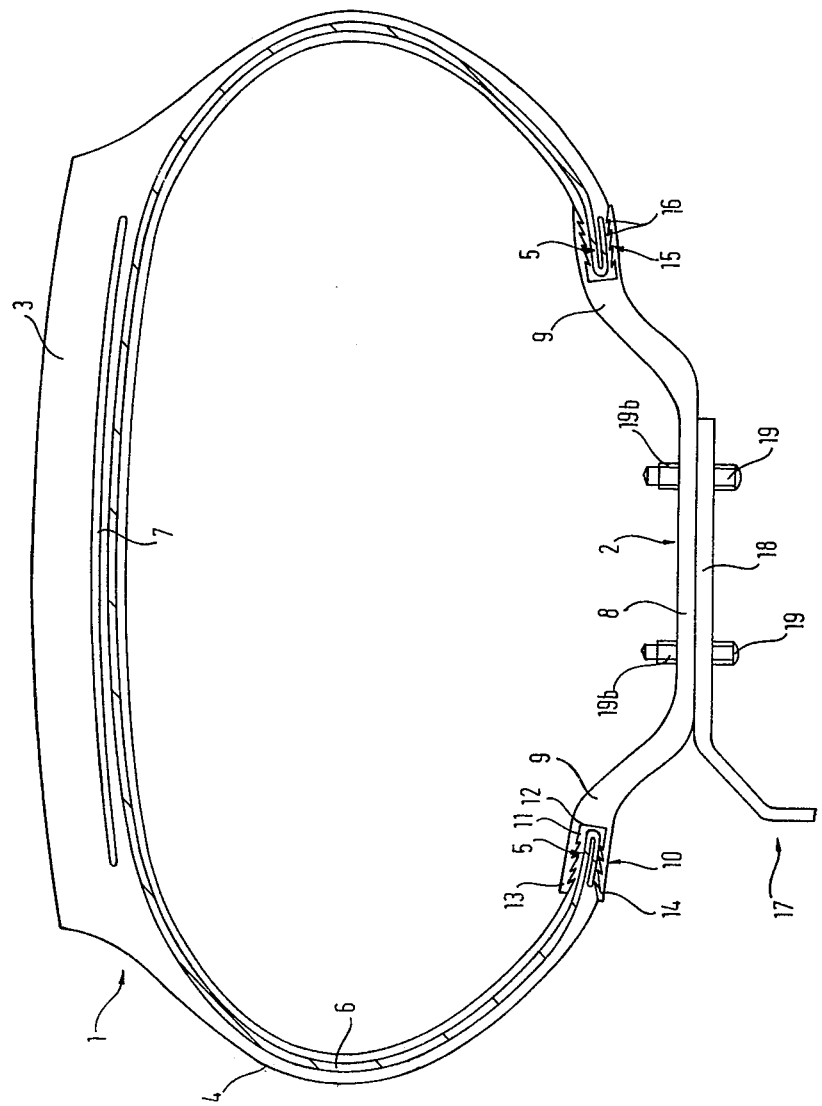

PNEUMATIC TIRE AND WHEEL RIM ASSEMBLY

This invention concerns improvements in or relating to a pneumatic tire and wheel rim assembly.

Pneumatic tires are retained on their wheel rims by the engagement of beads, one at the radially inward edge of each sidewall, on bead seats. The bead seats are tapered so that inflation pressure forces the bead onto the taper to effect the engagement. The bead regions of tires are accordingly designed to provide for the taper engagement as well as anchorage of the carcass reinforcement. This requires a comparatively rigid zone in the tire bead which extends into the lower sidewall and in heavy duty tires such as are used for trucks this rigid zone may extend for up to 20% of the section height of the tire. Flexing of the sidewall is therefore transmitted to a rigid bead zone which is stiff and inefficient in absorbing deflection. As a result premature failure of the tire is often caused by failure of the bead. In addition the provision of a relatively large bead zone reduced the length of the sidewall and consequently the sidewall is not able to be very efficient in absorbing deflection. Furthermore the complexities of providing the necessary bead zone stiffness incurs cost.

One object of the present invention is to provide an improved means of retaining a tire on a wheel rim which obviates some of the above problems.

According to the present invention we provide a pneumatic tire and wheel rim assembly wherein the wheel rim has a pair of axially spaced bead seats in each of which a respective one of a pair of axially spaced tire beads is located and each bead seat includes retaining means for retaining the associated bead in the bead seat.

Preferably each bead seat comprises a groove, preferably an annular groove, having a base portion and a pair of opposed side portions. Preferably the side portions are substantially parallel to one another to facilitate insertion of the associated tire bead.

The side portions preferably extend in a generally axially outwards direction leading from the base portion. The side portions may be inclined up to 40° in a radially outwards direction relative to a line parallel with the axis of rotation of the wheel rim. More preferably the side portions are inclined at an angle of 30° or less.

The retaining means may comprise projections e.g. teeth or circumferentially extending ribs arranged and constructed to allow insertion of the tire bead into the associated groove but which engages the tire bead to prevent subsequent removal of the tire bead from the groove.

The projections may extend around one side portion of the groove only but preferably the projections extend around both side portions of the groove. Projections comprising teeth may be arranged in groups with one group on one side portion being opposite or staggered relative to a similar group on the other side portion.

Alternatively the retaining means may comprise a plurality of retaining members each of which extends across the width of the associated groove through the tire bead to retain the tire bead in the groove. The retaining members may comprise, for example bolts or rivets, which can be located from the outside of the assembly after the tire beads have been located in the grooves.

Where the retaining means comprises projections the side portions of each groove may be parallel or relatively divergent and subsequently pressed or crimped towards each other to increase the grip of the projections on the associated tire bead.

Each tire bead comprises a region of rubber, preferably hard rubber and may be reinforced, for example a bead core. Where the beads are reinforced by bead cores the latter may be of the steel cable type, other known steel reinforcement or any other substantially inextensible material. Where provided the bead reinforcement preferably does not extend into the lower portion of the adjacent tire sidewall to any appreciated extent.

Preferably the tire is a low aspect tire, having an aspect ratio of 70% or less, preferably 60% or less and is preferably a radial tire. Preferably the tire bead is wider than the axial distance between the bead seats.

According to a further aspect of the present invention we provide a pneumatic tire for the assembly according to the invention.

According to yet a further aspect of the present invention we provide a wheel rim for the assembly according to the present invention.

The invention will now be described in more detail, by way of example only, with reference to the accompanying drawing the single FIGURE of which is a section through a pneumatic tire and wheel rim assembly according to the present invention.

The pneumatic tire and wheel rim assembly shown in the accompanying drawing comprises a radial tire 1 having an aspect ratio of 50% and a wheel rim 2 formed by casting.

The tire 1 has a tread 3, sidewalls 4 and a pair of annular axially spaced beads 5. A single steel cord ply 6 extends circumferentially around the tire from one bead region to the other bead region. Each bead 5 comprises a region of hard rubber in which the ends of the ply 6 are embedded. Tread reinforcements indicated generally by the reference numeral 7 are provided radially outwards of the ply 6 and reinforce the crown of the tire.

The wheel rim 2 comprises a rim member having a cylindrical centre portion 8 and end portions 9 which define a pair of annular axially spaced bead seats 10.

Each bead seat 10 is similar and comprises a groove 11 having a base portion 12 and side portions 13,14. The side portions 13,14 extend parallel to one another and are inclined radially outwards at an angle of 15° relative to a line parallel with the axis of rotation of the wheel rim. Retaining means 15 comprising projections in the form of teeth are provided on the inner surface of the side portions 13,14 of the grooves. As shown the teeth 16 are inclined towards the base portion 12 of the associated groove to allow the tire beads 5 to be inserted into the grooves 11. The tire tread 3 is wider than the axial distance between the axially outer regions of the grooves, i.e. the mouth portion of the grooves.

A wheel disc 17 having a cylindrical portion 18 which fits within the centre portion 8 is secured to the wheel rim by bolts 19 which engage threaded nuts 19b welded to the inside of the centre portion 8. The bolts 19 are rendered air-tight by O-rings (not shown). Alternatively an inner tube may be provided.

A valve (not shown) in the wheel rim 2 allows the tire to be inflated in the usual manner.

It will be appreciated that when the tire and wheel rim are assembled the teeth 16 engage the beads 5 to prevent removal of the beads from the associated groove 11 and inflation pressure tensions the reinforcement ply and tends to embed the teeth further in the beads to retain the beads in place.

When the treads are inserted in the grooves the side portions 13,14 may be crimped or pressed together by means of a suitable tool to increase the grip of the teeth 16 on the beads 5.

The invention is not restricted to the abovedescribed embodiment which may be modified in a number of ways, for example the side portions 13,14 of each groove may be relatively divergent in a direction leading from the base 12 to facilitate insertion of the beads and the side portions subsequently pressed or crimped together until they are parallel to one another or relatively convergent. The axially outer edges of the side portions 13,14 may be profiled to form radii to reduce or avoid chafing.

The teeth may be provided on one side portion only of each groove or arranged in groups on both side portions, the groups on opposed side portions being opposed or staggered relative to one another.

The side portions may extend axially or may be inclined radially inwards or radially outwards at any angle relative to a line parallel with the axis of rotation of the wheel rim.

The teeth 16 may be replaced by circumferentially extending ribs. Alternatively the retaining means may comprise bolts or rivets which are located in position after the beads have been inserted in the grooves. The bolts or rivets extend across the width of the groove through the associated bead to secure the beads in the grooves.

The beads may be reinforced, for example, by a bead core which may be of the steel cable type or any other type of bead reinforcement known to those skilled in the art.

The wheel rim may be a single component or the wheel rim may comprise a multi-component wheel rim the individual components of which may be formed by any suitable technique, for example casting. If the wheel rim is multi-component, sealing means is provided between the rim components.

Finally it will be understood that the tire may be tubeless or an inner tube may be provided.

Having now described our invention, what we claim is:

1. A pneumatic tire and wheel rim assembly comprising a tire having a tread, a pair of sidewalls and a pair of axially spaced tire beads and a wheel rim the lateral margins of which are profiled to define a pair of axially spaced circumferential grooves in each of which a respective one of said tire beads is located, each groove comprising a base portion and a pair of opposed side portions integral therewith, said side portions of each groove having projections integral therewith in engagement with the associated tire bead, and said groove side portions being formed of a deformable material allowing said groove side portions to be relatively convergent subsequent to insertion of the associated tire bead therebetween, whereby the grip exerted by said projections on said tire bead is increased.

2. An assembly according to claim 1 wherein said projections are inclined in a direction leading towards said base portion of an associated groove.

3. An assembly according to claim 1 wherein said projections comprise circumferentially extending ribs.

4. An assembly according to claim 1 wherein said projections comprise teeth.

5. An assembly according to claim 4 wherein said teeth are arranged in groups on both side portions of a groove.

6. An assembly according to claim 1 wherein each tire bead comprises a region of hard rubber.

7. An assembly according to claim 1 wherein each tire bead has a substantially inextensible bead reinforcement.

8. An assembly according to claim 7 wherein said bead reinforcement is substantially outside the lower portion of the adjacent tire sidewall to any appreciable extent.

9. An assembly according to claim 1 wherein said tire is a radial tire.

10. An assembly according to claim 9 wherein said tire has an aspect ratio of 70% or less.

11. An assembly according to claim 1 wherein said tire tread has an axial width which exceeds the axial distance between the axially outermost portions of said bead seats.

12. An assembly according to claim 1 wherein said rim is multi-component.

13. An assembly according to claim 1 including a wheel disc for mounting the assembly on a vehicle.

* * * * *